(12) United States Patent
Nishimura (10) Patent No.: US 6,473,680 B2
(45) Date of Patent: Oct. 29, 2002

(54) ENGINE OVERRUN PREVENTION SYSTEM FOR AUTOMATIC TRANSMISSION (75) Inventor: Nobuyuki Nishimura, Kawasaki (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/794,780

(22) Filed: Feb. 27, 2001

(65) Prior Publication Data

US 2001/0020206 A1 Sep. 6, 2001

(30) Foreign Application Priority Data

Mar. 3, 2000 (JP) ........................ 2000-063337

(51) Int. Cl.⁷ .................... B60K 41/04; B60K 41/08
(52) U.S. Cl. .................... 701/54; 701/52; 477/110; 477/107
(58) Field of Search .................. 701/51, 52, 54, 701/62; 477/110, 107, 132, 139, 117, 150, 78; 74/335, 473.18, 336 R (56) References Cited

U.S. PATENT DOCUMENTS

| 4,208,925 A | | 6/1980 | Miller et al. .................. 74/866 |
|---|---|---|---|
| 4,732,246 A | * | 3/1988 | Tateno et al. ............. 192/0.052 |
| 4,846,022 A | | 7/1989 | Ito et al. ........................ 74/866 |
| 4,867,194 A | * | 9/1989 | Hayasaki et al. ............ 137/118 |
| 5,032,993 A | | 7/1991 | Hasegawa et al. ........ 364/424.1 |
| 5,415,056 A | * | 5/1995 | Tabata et al. ................. 74/335 |
| 5,609,547 A | | 3/1997 | Matsushita et al. ......... 477/110 |
| 6,076,414 A | * | 6/2000 | Tabata et al. ................. 74/335 |

FOREIGN PATENT DOCUMENTS

DE 19740647 A1 9/1997 ........... F16H/61/16

* cited by examiner

Primary Examiner—Tan Nguyen
Assistant Examiner—Dalena Tran
(74) Attorney, Agent, or Firm—McCormick, Paulding & Huber LLP

(57) ABSTRACT

A controller (9) estimates (calculates) an engine revolution speed of after shifting to a target gear position, based on vehicle speed and a gear ratio of an automatic transmission (3) at the target gear position. Then, the controller (9) changes the target gear position to a higher one when the calculated engine revolution speed is not less than a preset value. The controller changes the target gear position by one or more gears. Since the target gear position is raised, an engine does not overrun upon shifting down. If the target gear position is lower than a current gear position by one gear, and an engine overrun is expected, no shifting down is admitted.

20 Claims, 6 Drawing Sheets

SHIFT UP MAP

FIG. 6

SHIFT DOWN MAP

ENGINE OVERRUN PREVENTION SYSTEM FOR AUTOMATIC TRANSMISSION

CROSS REFERENCES TO RELATED APPLICATIONS

This application claims priority under 35 USC 119 of Japanese Patent Application No. 2000-63337 filed on Mar. 3, 2000, the entire disclosure of which is incorporated herein by reference.

BACKGROUND OF THE INVENTION

1. Field of the Invention

The present invention relates to an engine overrun prevention system for an automatic transmission, and more particularly to such system suitable for a large vehicle.

2. Description of the Related Art

Recently, in order to lighten a driver's burden, large vehicles such as tractors and large tracks are often equipped with an automatic clutch and automatic transmission. In such vehicles, a target transmission gear is determined by a vehicle speed or driver's moving a shift lever, a clutch is automatically disengaged and engaged and the transmission is automatically shifted to a desired gear.

When a vehicle is running on a down slope with an engine brake, a driver sometimes shifts the transmission to a lower gear in order to enhance the engine brake. In this situation, when the clutch is disengaged, the vehicle runs without any load. Therefore, the vehicle is accelerated until the clutch is engaged. If the steep shifting down occurs, e.g., from the $8^{th}$ gear to the $3^{rd}$ gear, the engine is caused to rotate at an excessively high speed (i.e., overrun) upon engaging of the clutch. This results in an excessive deceleration shock and makes the driver feel uncomfortable.

In particular, the tractor has a greater number of gear positions, e.g., 16 gear positions, than a normal passenger car, and gear ratios are close to each other on a low gear side. Accordingly, the driver tends to shift the transmission to a very low gear. This causes, as mentioned above, overrunning of the engine and excessive deceleration shock.

SUMMARY OF THE INVENTION

An object of the present invention is to overcome the above described problems.

According to one aspect of the present invention, there is provided an engine overrun prevention apparatus suitable for an automatic transmission including a first controller for calculating an engine revolution speed of after shifting to a target gear position from a current gear position, based on vehicle speed and a gear ratio of an automatic transmission at the target gear position, and a second controller for changing the target gear position to a higher gear position when the calculated engine revolution speed is equal to or greater than a preset value. Since the target gear position is raised when an engine revolution speed is assumed to become greater than the predetermined value, the shifting down is moderated. As a result, an engine overrun upon shifting down will not occur. If the target gear position is one gear below a current gear position, then no shifting down is admitted as far as the engine overrun is expected.

The second controller may change the target gear position by one or more gears. The target gear position may be determined from manual movement of a shift lever. The automatic transmission may be a remote control type manual transmission that is shifted up and down under the control of another controller based on a signal generated upon manual movement of the shift lever. This signal may be generated by a shift switch associated with the shift lever.

According to another aspect of the present invention, there is provided an engine overrun prevention method including the steps of determining whether an engine revolution speed at a target gear position is greater than a preset value, and changing the target gear position to a higher gear position.

Additional objects, benefits and advantages of the present invention will become apparent to those skilled in the art to which this invention relates from the subsequent description of the embodiments and the appended claims, taken in conjunction with the accompanying drawings.

DETAILED DESCRIPTION OF THE INVENTION

Now, an embodiment of the present invention will be described in reference to the accompanying drawings.

Figure 2:
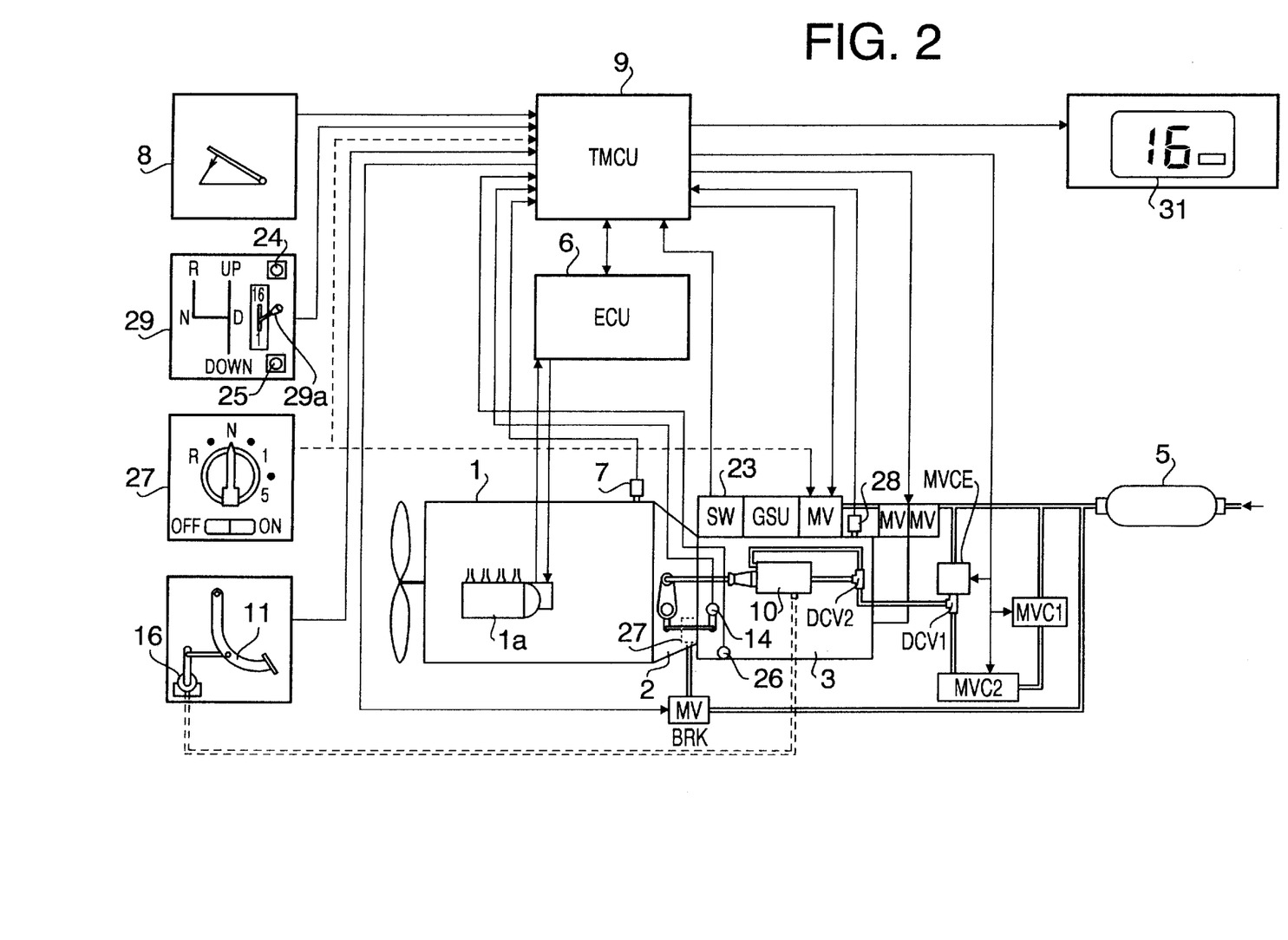
FIG. 2 illustrates an engine drive system of a vehicle according to one embodiment of the invention.

Referring first to FIG. 2, illustrated is an engine drive system of a tractor which tows a trailer. A diesel engine 1 has a clutch 2 and transmission 3, and an output shaft 4 (FIG. 3) of the transmission 3 is connected to a propeller shaft (not shown) to drive rear wheels (not shown). The diesel engine 1 is electronically controlled by an engine control unit (ECU) 6. Specifically, ECU 6 detects current engine revolution speed and engine load from outputs of an engine revolution speed sensor 7 and accelerator pedal depression sensor 8, and controls a fuel injection pump 1a primarily based on these outputs such that fuel is injected at an appropriate timing in an appropriate amount.

Figure 3:
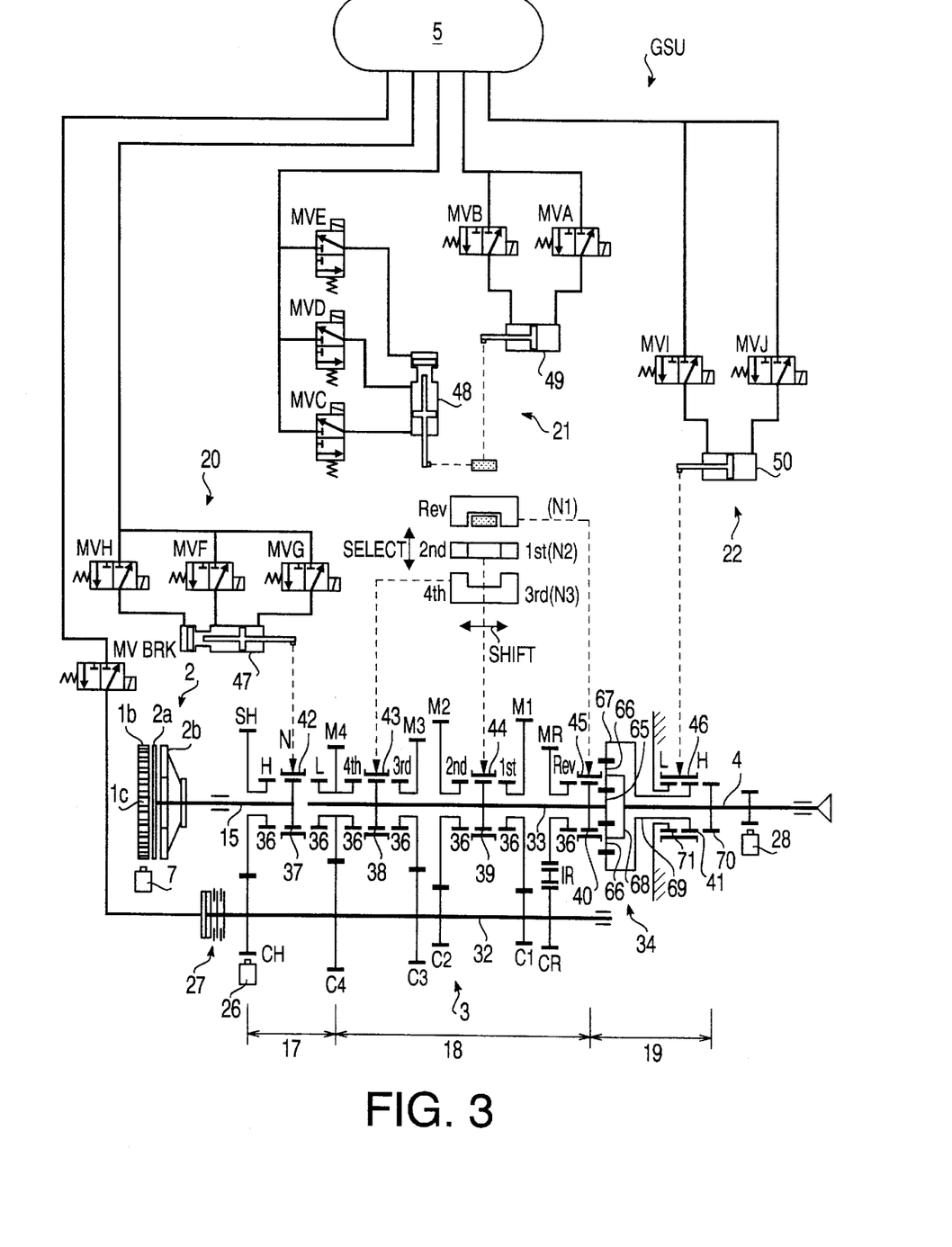
FIG. 3 illustrates an automatic transmission employed in the engine drive system shown in FIG. 2.

As illustrated in FIG. 3, a flywheel 1b having a ring gear 1c along its outer periphery is mounted on a crankshaft of the engine 1. As teeth of the ring gear 1c pass by the engine revolution speed sensor 7, pulses are generated from the sensor 7. ECU 6 counts the number of the pulses per a unit time to calculate the engine revolution speed.

Referring back to FIG. 2, the clutch 2 and transmission 3 are automatically controlled based on control signals of a transmission control unit (TMCU) 9. ECU 6 and TMCU 9 are connected to each other by bus and cables such that they can communicate with each other.

Figure 4:
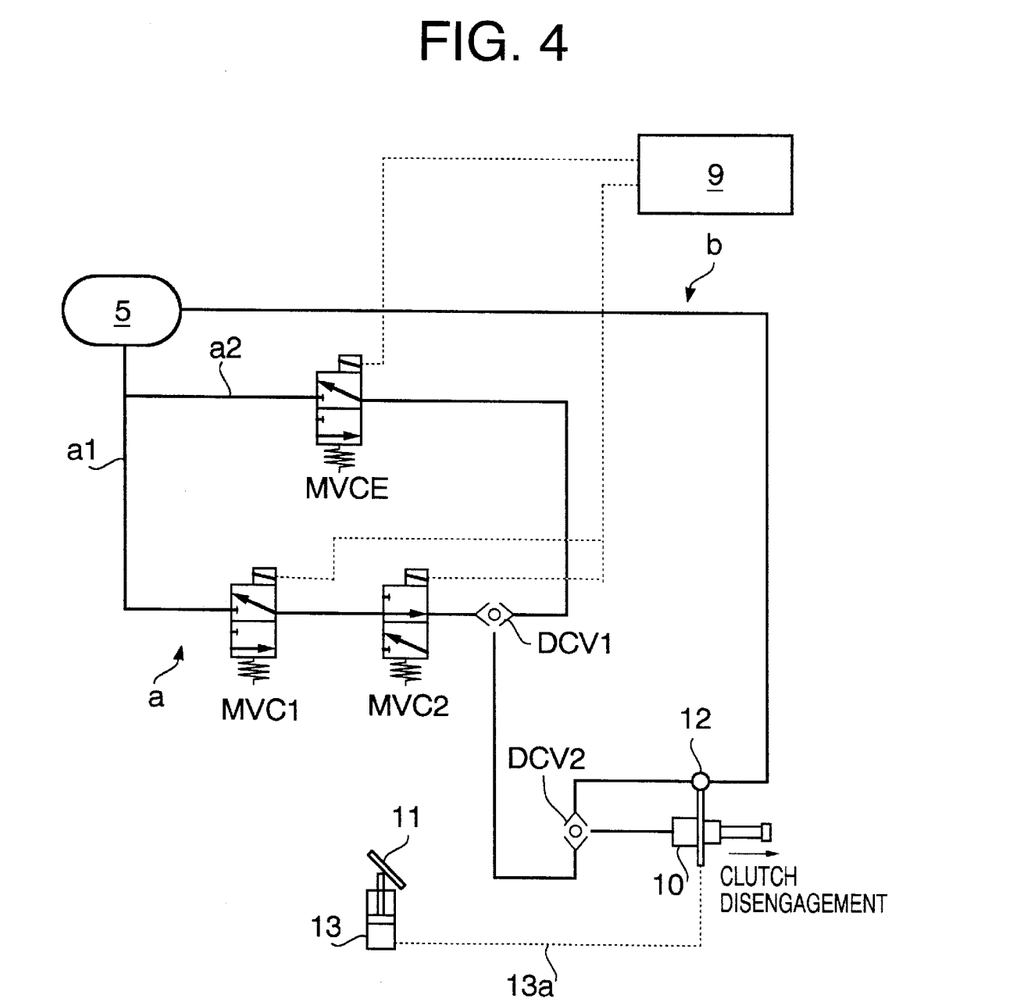
FIG. 4 illustrates an automatic clutch.

As shown in FIGS. 2 to 4, the clutch 2 is a mechanical friction type, and includes the flywheel 1b on the input side, a driven plate 2a on the output side, and a pressure plate 2b for causing the driven plate 2a to frictionally contact and leave the flywheel 1a. The clutch 2 is equipped with a clutch booster 10 for moving the pressure plate 2b in an axial direction so that the clutch 2 is automatically disengaged and engaged in most cases. Thus, a burden on a driver is lessened. In order to enable delicate clutch movement for very slow speed backward movement of the vehicle or sudden clutch disengagement in an emergency situation, manual clutch disengagement and engagement by a clutch pedal 11 is also possible in the illustrated embodiment. Therefore, the clutch 2 is a so-called selective automatic clutch. A clutch stroke sensor 14 is provided for detecting a stroke of the clutch itself (i.e., position of the pressure plate 2b), and a clutch pedal stroke sensor 16 is provided for detecting how deep the clutch pedal 11 is stamped. These sensors 14 and 16 are connected to TMCU 9 respectively.

As best shown in FIG. 4, the clutch booster 10 is connected to an air tank 5 by two air passages "a" and "b" as indicated by the two solid lines, such that it is activated by air pressure fed from the air tank 5. The air passage "a" is used for automatic clutch disengagement and engagement, and the other air passage "b" is used for manual disengagement and engagement. The air passage "a" is divided to two branches a1 and a2. Electromagnetic valves MVC1 and MVC2 for automatic disengagement and engagement are provided on one of the branches a1 in series and an electromagnetic valve MVCE for emergency situation is provided on the other branch a2. At a position where these two branches meet, provided is a double check valve DCV1. The second air passage "b" has a hydraulic valve 12 associated with the clutch booster 10. At a position where the two air passages "a" and "b" meet, provided is another double check valve DCV2. The double check valves DCV1 and DCV2 are a three-way valve which is operated by pressure difference.

The electromagnetic valves MVC1, MVC2 and MVCE are turned on and off by TMCU 9. When turned on, the upstream side of the electromagnetic valve is communicated with its downstream side. When turned off, the electromagnetic valve closes the air path, and the downstream side is communicated with the atmosphere. First, the automatic disengagement and engagement will be described. The electromagnetic valve MVC1 is simply turned on and off upon turning on and off of an ignition key. When the ignition key is in an off position, i.e., the vehicle is stopped, the electromagnetic valve MVC1 blocks off the air pressure from the air tank 5. The electromagnetic valve MVC2 is a proportional control valve and is able to arbitrarily control an amount (flow rate) of air to be fed and discharged. This is necessary for controlling a speed of disengagement and engagement of the clutch. When the electromagnetic valves MVC1 and MVC2 are both turned on, the air pressure of the air tank 5 causes the double check valves DCV1 and DCV2 to switch such that the air pressure is fed to the clutch booster 10. As a result, the clutch is disengaged. On the other hand, when the clutch should be engaged, the electromagnetic valve MVC2 is only turned off to release the air pressure from the clutch booster 10 via the electromagnetic valve MVC2.

If the electromagnetic valve MVC1 or MVC2 malfunctions and is turned off during the clutch disengagement, the clutch is suddenly engaged in opposition to the driver's intent. Thus, when such abnormality is detected by an abnormality diagnosis circuit of TMCU 9, the electromagnetic valve MVCE is immediately turned on. Then, the air pressure passing through the electromagnetic valve MVCE switches the double check valve DCV1 in an opposite way so that the air pressure is supplied to the clutch booster 10 to maintain the disengaged condition of the clutch. Accordingly, sudden engagement of the clutch is prevented.

Next, the manual operation will be described. Upon stamping and releasing of the clutch pedal 11, the oil pressure is fed to and discharged from a master cylinder 13. This hydraulic pressure is fed to the hydraulic valve 12 by an oil passage 13a as indicated by the broke line. As a result, the hydraulic valve 12 is opened and closed, and the air pressure is fed to and released from the clutch booster 10. This results in disengagement and engagement of the clutch 2. As the hydraulic valve 12 is opened, the air pressure passing through this valve switches the double check valve DCV2 and is introduced to the clutch booster 10. It should be noted that if the automatic disengagement and engagement and the manual disengagement and engagement interfere with each other, priority is given to the manual disengagement and engagement in this embodiment.

As illustrated in FIG. 3, the transmission 3 is a so-called multiple gear transmission of always-engaged type, and has sixteen gear positions for forward movement and two gear positions for backward movement. The transmission 3 itself has a structure similar to a manual transmission. Specifically, the transmission 3 includes an auxiliary transmission on its input side, namely splitter 17, another auxiliary transmission on its output side, namely range gear assembly 19, and a main gear assembly 18 therebetween. An engine power transmitted to the input shaft 15 is transferred to the output shaft 4 via the splitter 17, main gear assembly 18 and range gear assembly 19 in turn.

A gear shift unit GSU is provided for automatically shifting the transmission 3. The gear shift unit GSU includes a splitter actuator 20 for gear change of the splitter 17, a main gear actuator 21 for gear change of the main gear assembly 18 and a range gear actuator 22 for gear change of the rang gear assembly 19.

Like the clutch booster 10, these actuators 20 to 22 are pneumatically driven under the control of TMCU 9. A gear position of each gear assembly 17, 18, 19 is detected by an associated position switch 23 (FIG. 2). A rotation speed of a countershaft 32 is detected by a countershaft rotation sensor 26, and a rotation speed of the output shaft 4 is detected by an output shaft rotation sensor 28. These detection signals are sent to TMCU 9.

The illustrated transmission has a manual mode switch, and a manual gear position change based on a shift lever operation by a driver is possible. In this case, as illustrated in FIG. 2, disengagement and engagement of the clutch 2 and gear position change of the transmission 3 are performed upon signals from a shift lever unit 29 next to a driver's seat. The shift lever unit 29 includes a shift switch (not shown) for outputting a signal corresponding to a manual operation of a shift lever 29a. Thus, when a driver moves the shift lever 29a, a corresponding signal is sent to TMCU 9, based on which signal TMCU 9 actuates the clutch booster 10, splitter actuator 20, main gear actuator 21 and range gear actuator 22, thereby conducting a series of gear position change operations. A monitor 31 is associated with TMCU 9 to indicate a current gear position. As described above, as far as the manual mode is selected, the automatic transmission 3 functions as a remote-control-type manual transmission which is shift-controlled by TMCU 9 based on output signals of the shift switch. In other words, the manual transmission is automatically controlled by the actuators without using a shift cable.

The shift lever unit 29 has a reverse position R, a neutral position N, a drive position or range D, a shift up position UP and a shift down position DOWN. When the shift lever 29a is moved to one of these positions, a corresponding signal is generated. A mode switch 24 for switching a gear shift mode between the automatic and manual modes is provided near the driver's seat, and a skip switch 25 for switching between one-gear-by-one- gear shifting and every other gear shifting (e.g., shifting from the first gear to the third gear) is also provided near the driver's seat.

In the automatic shifting mode, if the shift lever 29a is moved to the D range, the transmission gear position is automatically changed with a vehicle speed. Even during the automatic shifting mode, however, if the driver moves the shift lever 29a into the UP or DOWN position, the transmission gear is shifted in a manual manner. In the automatic shifting mode, if the skip switch 25 is off (i.e., normal mode), the shifting takes place one gear by one gear. Th is advantageous when a tractor draws a trailer or a vehicle carries a heavy load. When the skip switch 25 is turned on (i.e., skip mode), the transmission gear is changed in a skipping manner. This is advantageous when the tractor does not tow the trailer or the vehicle carries a light or no load.

On the other hand, if the manual shift mode is selected, the transmission gear position change is conducted completely by a driver's intention. If the shift lever 29a is in the D range, the gear shifting does not occur; a current gear position is maintained. Only when the driver moves the shift lever 29a into the UP or DOWN position, the transmission gear position is changed. The function of the skip switch 25 is the same as described earlier: when the skip switch 25 is off, th e transmission 3 shifts one gear by one gear, and when the skip switch 25 is on, the transmission 3 shifts every other gear.

In a passenger compartment of the vehicle, provided is an emergency shift switch 27 which allows a driver to manually shift the transmission when, for example, the electromagnetic valve of GSU fails, by pressing the emergency switch 27 and turning an associated knob.

As illustrated in FIG. 3, the input shaft 15, main shaft 33 and output shaft 4 are coaxially arranged in the transmission 3, and the countershaft 32 extends below and in parallel to these shafts. The input shaft 15 is connected to the driven plate 2a of the clutch 2, and the input shaft 15 and main shaft 33 are supported such that they are rotatable relative to each other.

Next, the splitter gear assembly 17 and main gear assembly 18 will be described. A split high gear SH is rotatably supported on the input shaft 15. Main gears M4, M3, M2, M1 and MR, in this order from the front, are rotatably mounted on the main shaft 33. These gears SH, M4, M3, M2 and M1 except MR always engage with countergears CH, C4, C3, C2 and C1 secured on the countershaft 32 respectively. The gear MR always engages with an idle reverse gear IR, and this idle reverse gear IR always engages with a countergear CR fixed on the countershaft 32.

The gears SH, M4, . . . mounted on the input shaft 15 and main shaft 33 have splines 36 such that the respective gears are selectable. In the vicinity of these splines 36, provided are first to fourth splines 37 to 40 secured on the input shaft 15 and main shaft 33. First to fourth sleeves 42 to 45 always engage with the first to fourth splines 37 to 40 such that they can slide back and forth. By selectively sliding the first to fourth sleeves 42 to 45 for engagement with/disengagement from the gear-based splines 36, the transmission is geared in and out (moved into a certain position or the neutral position/condition). The splitter actuator 20 causes the first sleeve 42 to move, and the main actuator 21 causes the second to fourth sleeves 43 to 45 to move.

As described above, the splitter assembly 17 and main gear assembly 18 are an "always engaged" type, which can automatically be geared up and down by the associated actuators 20 and 21. The splines of the splitter assembly 17 have ordinary mechanical synchronization units, but the splines of the main gear assembly 18 do not have any synchronization units. Because of this, a so-called synchronization control is executed to match the engine revolution speed and the gear rotation speed so that the shifting up and down is possible without synchronization mechanisms. The illustrated splitter assembly 17 has a neutral position to prevent gear noises. The detailed structure of the splitter assembly 17 having the neutral position is found in Japanese Patent Application No. 11-319915 or corresponding U.S. patent application Ser. No. 09/707,897 filed on November 7, 2000 entitled "MULTI-STAGE TRANSMISSION OF VEHICLE" (Attorney Docket No. 5616-0027), the entire disclosure of which is incorporated herein by reference.

Next, the structure of the range gear assembly 19 will be described. The range gear assembly 19 employs a planetary gear mechanism 34 and is shiftable to a high or low gear position. The planetary gear mechanism 34 includes a sun gear 65 secured on the rear end of the main shaft 33, a plurality of planetary gears 66 in engagement with the outer periphery of the sun gear 65, and a ring gear 67 surrounding the planetary gears 66. The ring gear 67 has inner teeth and engage with the planetary gears 66. The planetary gears 66 are rotatably supported by a common carrier 68, which is connected to the output shaft 4.

The ring gear 67 has a tubular portion 69 that fits over the output shaft 4. The tubular portion 69 and output shaft 4 are rotatable relative to each other and constitute a double shaft structure.

The tubular portion 69 has a fifth spline 41. Closely behind the fifth spline 41, provided is an output shaft spline 70 secured on the output shaft 4. Closely in front of the fifth spline 41, provided is a stationary spline 71 fixed to a transmission casing. A fifth sleeve 46 always engages with the fifth spline 41 and is slidable back and forth. The range gear actuator 22 causes the fifth sleeve 46 to move. The splines of the range gear assembly 19 are equipped with synchronization units.

As the fifth sleeve 46 moves forwards, it engages with the fixed spline 71 whereby the fifth spline 41 is coupled with the fixed spline 71. As a result, the ring gear 67 is fixed to the transmission casing, and the output shaft 4 is caused to rotate at a reduction ratio greater than one. This is the low gear position.

On the other hand, as the fifth sleeve 46 is moved backwards, it engages with the output shaft spline 70 so that the fifth spline 41 is coupled with the output shaft spline 70. Accordingly, the ring gear 67 and carrier 68 are fixed relative to each other, and the output shaft 4 is caused to rotate at a reduction ratio of one. This is the high gear position.

The transmission 3 has high and low gear positions in the splitter four gear positions in the main gear assembly 18, and high and low gear positions in the range gear assembly 19 so that it can be shifted between the first and sixteenth gear positions (2×4×2=16). When the transmission 3 is brought into a reverse mode, it can be shifted between the high and low gear positions with the splitter 17.

Next, the actuators 20, 21 and 22 will be described. Each actuator includes a pneumatic cylinder activated by the air pressure from the air tank 5, and an electromagnetic valve for switching between application of and releasing of the air pressure to and from the pneumatic cylinder. The electromagnetic valves of the actuators 20 to 22 are switched under the control of TMCU 9 so that the pneumatic cylinders are selectively driven.

The splitter actuator 20 includes a pneumatic cylinder 47 having a double piston, and three electromagnetic valves MVH, MVF and MVG. The electromagnetic valve MVH is turned on, the electromagnetic valve MVF is turned off and the electromagnetic valve MVG is turned on in order to bring the splitter 17 to the neutral position. When the splitter 17 is moved to the high gear position, the electromagnetic valve MVH is turned off, the electromagnetic valve MVF is turned off and the electromagnetic valve MVG is turned on. When the splitter 17 should be moved to the low position, the electromagnetic valve MVH is turned off, the electromagnetic valve MVF is turned on and the electromagnetic valve MVG is turned off.

The main actuator 21 includes a pneumatic cylinder 48 having a double piston for gear selection, and another pneumatic cylinder 49 having a single piston for gear shifting. The first pneumatic cylinder 48 is equipped with three electromagnetic valves MVC, MVD and MVE, and the second pneumatic cylinder 49 is equipped with two electromagnetic valves MVB and MVA.

The pneumatic cylinder 48 is caused to move downwards in the drawing when the electromagnetic valve MVC is turned off, the electromagnetic valve MVD is turned on and the electromagnetic valve MVE is turned off. Accordingly, the third gear, fourth gear or N3 (neutral position between the third and fourth gears) of the main gear assembly becomes selectable. The pneumatic cylinder 48 is brought into a neutral condition when the electromagnetic valve MVC is turned on, the electromagnetic valve MVD is turned off and the electromagnetic valve MVE is turned on. Accordingly, the first gear, second gear or N2 (neutral position between the first and second gears) of the main gear assembly becomes selectable. The pneumatic cylinder 48 is moved upwards in the drawing when the electromagnetic valve MVC is turned on, the electromagnetic valve MVD is turned off and the electromagnetic valve MVE is turned off. As a result, the reverse gear or N1 (neutral position) of the main gear assembly becomes selectable.

The other pneumatic cylinder 49 is brought into a neutral condition when the electromagnetic valve MVA is turned on and the electromagnetic valve MVB is turned on. Accordingly, N1, N2 or N3 of the main gear assembly becomes selectable. The pneumatic cylinder 49 is shifted to the left in the drawing if the electromagnetic valve MVA is turned on and the electromagnetic valve MVB is turned off. Accordingly, the second gear, fourth gear or reverse gear of the main gear assembly becomes selectable. The pneumatic cylinder 49 is shifted to the right in the drawing if the electromagnetic valve MVA is turned off and the electromagnetic valve MVB is turned on. As a result, the first or third gear of the main gear assembly becomes selectable.

The range gear actuator 22 includes a pneumatic cylinder 50 having a single piston, and two electromagnetic valves MVI and MVJ. The pneumatic cylinder 50 is shifted to the right in the drawing when the electromagnetic valve MVI is turned on and the electromagnetic valve MVJ is turned off. As a result, the range gear assembly is brought into the high position. The pneumatic cylinder 50 is shifted to the left when the electromagnetic valve MVI is turned off and the electromagnetic valve MVJ is turned on. As a result, the range gear assembly is brought into the low position.

The countershaft 32 is equipped with a countershaft brake 27 for applying a brake force to the countershaft 32 for the synchronization control. The countershaft brake 27 is a wet multi-plate type brake, and actuated by the air pressure from the air tank 5. Air pressure application and release is switched by an electromagnetic valve MV BRK. When the electromagnetic valve MV BRK is turned on, the air pressure is supplied to the countershaft brake 27 so that the countershaft brake 27 exerts a brake force. When the electromagnetic valve MV BRK is turned off, the air pressure is released from the countershaft brake 27 so that the countershaft brake 27 no longer applies a brake force.

Next, the automatic shift control to the transmission will be described. TMCU 9 has a shift up map shown in FIG. 5 and a shift down map shown in FIG. 6 in its memory. TMCU 9 performs the automatic shift control according to these maps when in the automatic shift mode. For example, in the shift up map of FIG. 5, shift up curves from an n'th gear to an n+1'th gear (n is an integer from one to fifteen) are determined as a function of an accelerator pedal depression (accelerator opening degree) (%) and output shaft rotation speed (rpm). A sole point is decided in the map from current accelerator pedal depression and output shaft rotation speed. When the vehicle is accelerating, the rotation speed of the output shaft 4 connected to wheels gradually increases. In the normal automatic shift mode, therefore, the shifting up takes place gear by gear every time a current point exceeds a nearest shift up curve. If the skip mode, on the other hand, the shifting up occurs every other gear.

Figure 5:
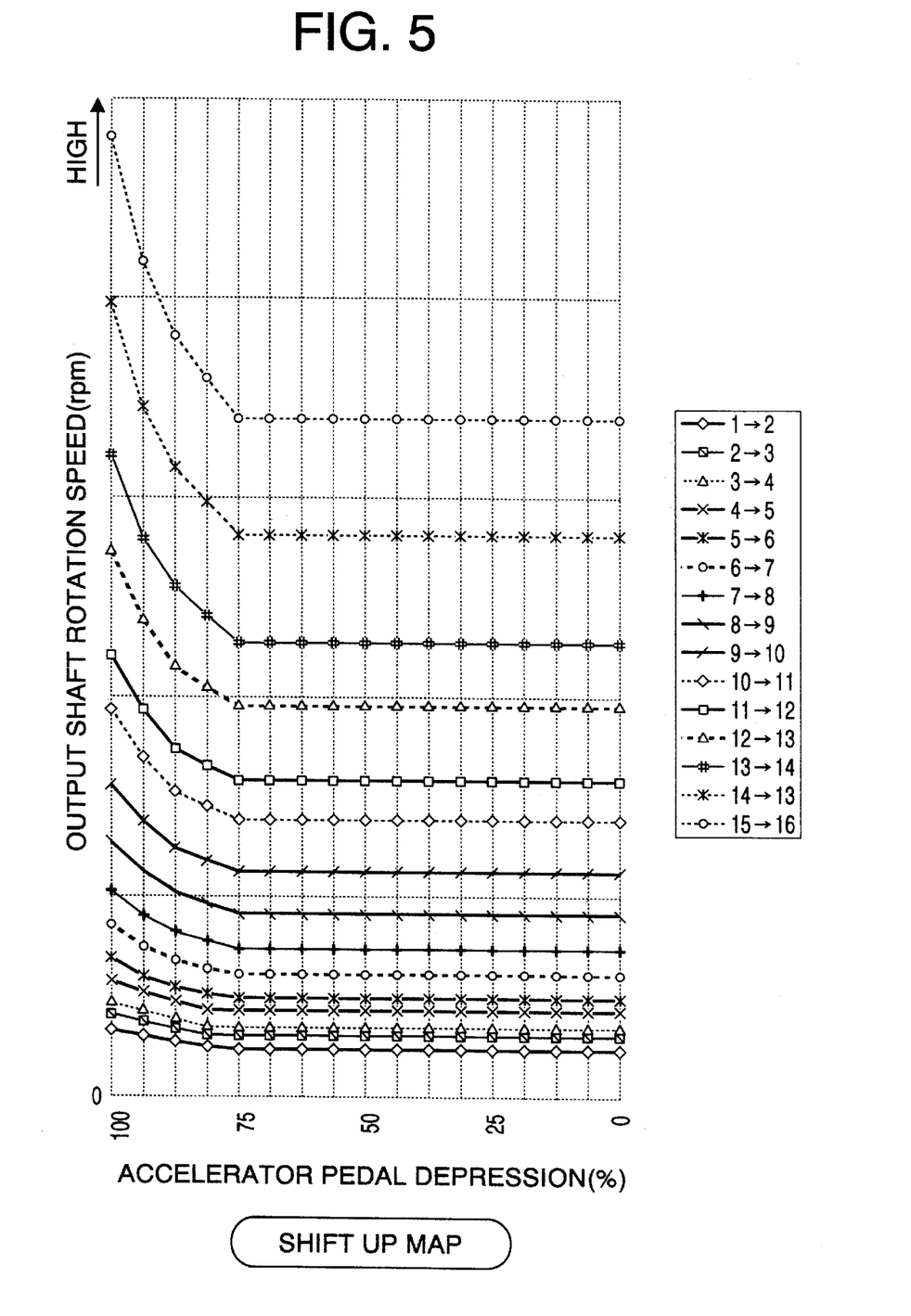
FIG. 5 illustrates a shift up map used in the engine overrun prevention control.
Figure 6:
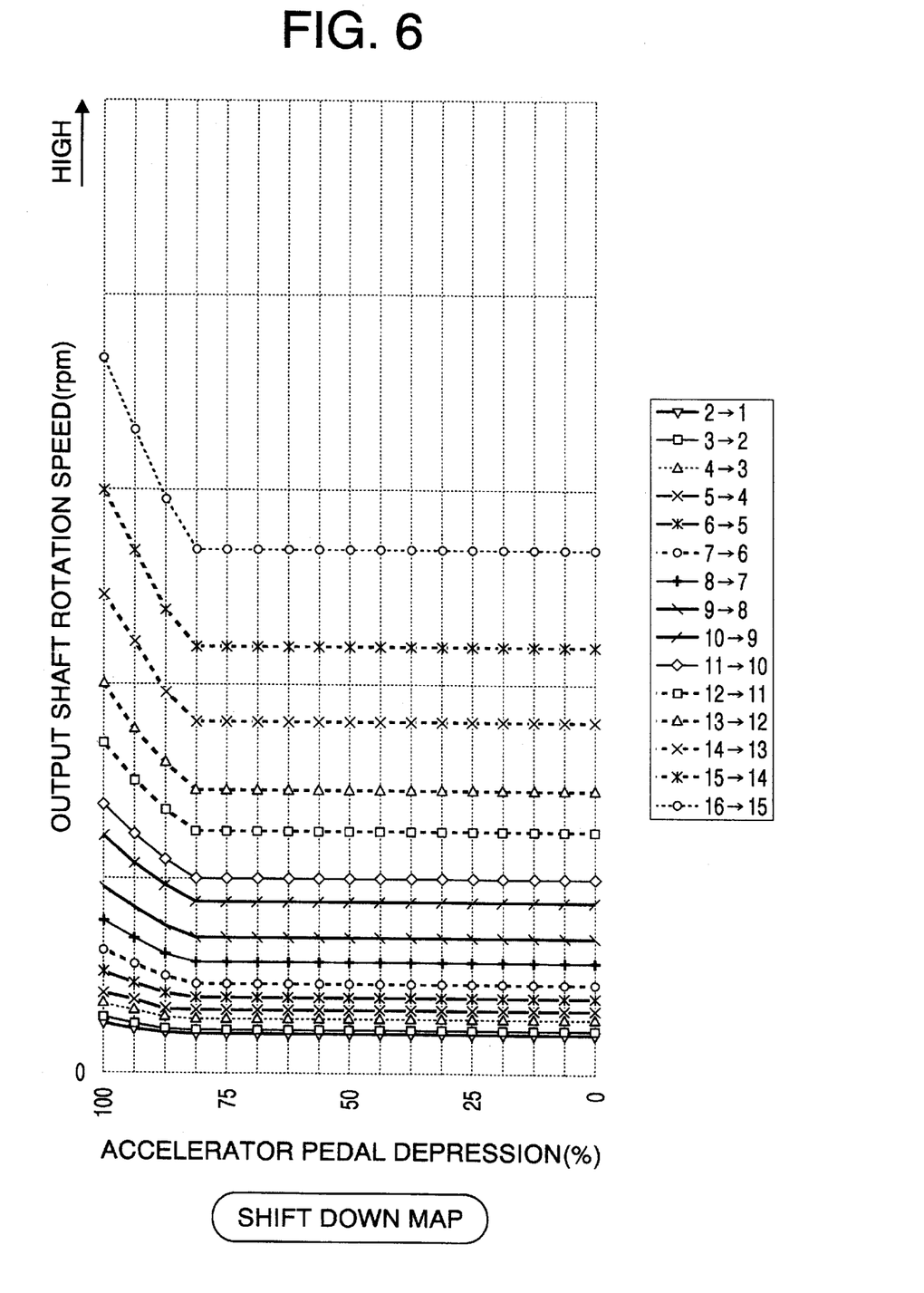
FIG. 6 illustrates a shift down map.

Like FIG. 5, in the shift down map shown in FIG. 6, shift down curves from an n+1'th gear (n is an integer from one to fifteen) to an n'th gear are determined as a function of the accelerator pedal depression (%) and output shaft rotation speed (rpm). A sole point is determined in the map from current accelerator pedal depression and output shaft rotation speed. During vehicle speed deceleration, the rotation speed of the output shaft 4 gradually drops so that in the normal automatic shift mode, the transmission 3 is shifted down gear by gear as the current point passes a nearest curve. In the skip mode, the shifting down of the transmission gear position takes place every other gear.

On the other hand, when the manual mode is selected, a driver can arbitrarily shift up and down the transmission 3 independently from these maps. In the normal mode, a single shift change operation made by the driver causes a single gear position change. In the skip mode, the single shift change operation results in a two-gear position change.

The current accelerator pedal depression is detected by the accelerator pedal sensor 8, and the current output shaft rotation speed is detected by the output shaft rotation speed sensor 28. TMCU 9 calculates a current vehicle speed from the current output shaft rotation speed and causes a speedometer to indicate it. Thus, the vehicle speed is indirectly detected from the output shaft rotation speed. The output shaft rotation speed corresponds to the vehicle speed.

Next, engine overrun prevention will be described. Referring back to FIG. 1, TMCU 9 first determines at step 101 whether a target gear position matches a current gear position. If yes, the program proceeds to END. If not, the program proceeds to step 102.

Figure 1:
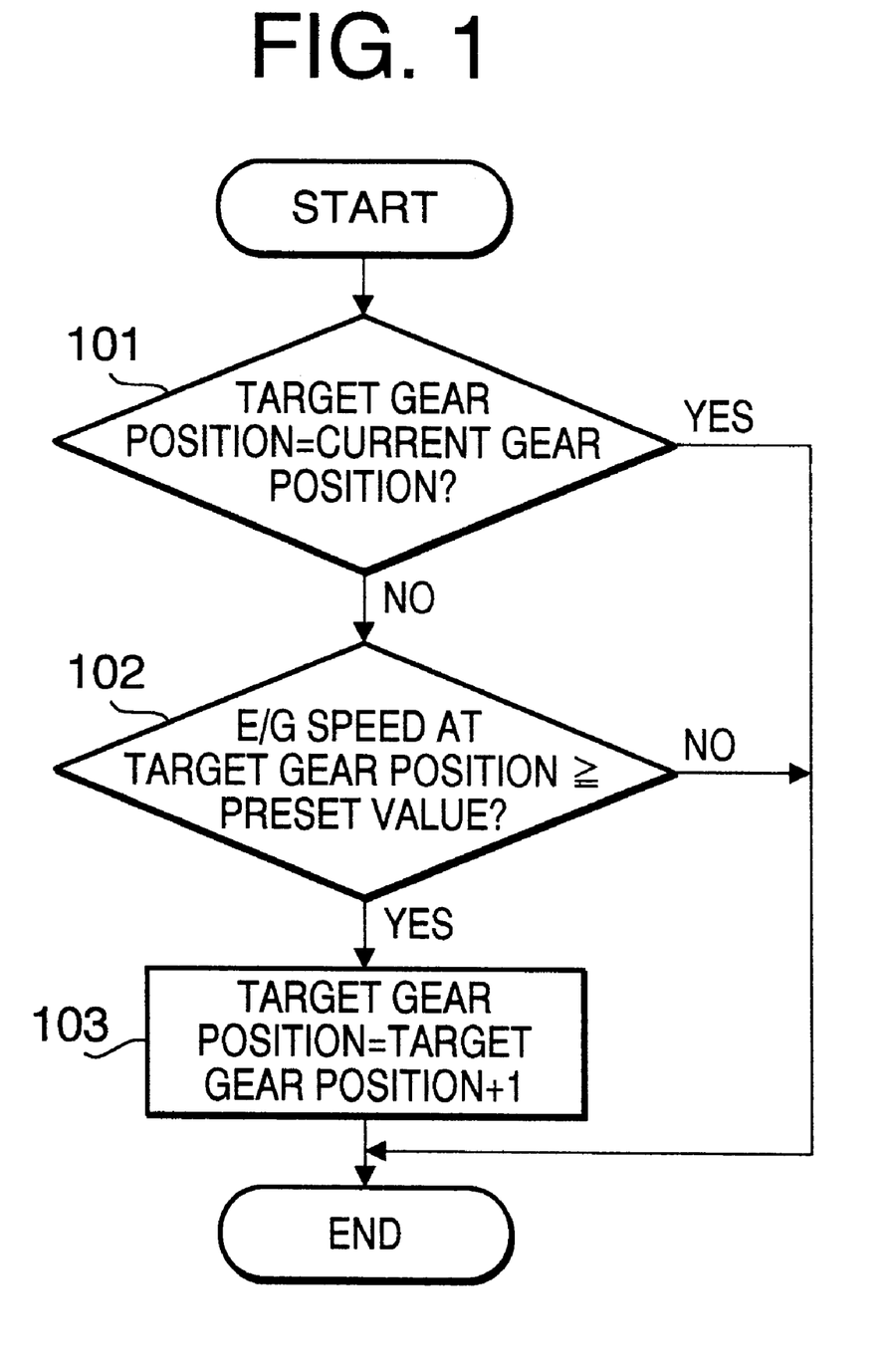
FIG. 1 illustrates a flowchart of an engine overrun prevention control according to the present invention.

Step 102 determines whether a transmission gear position change is in progress. The target gear position is determined from a signal of the shift lever unit 29 in the manual shift mode and from the shift up and down maps shown in FIGS. 5 and 6 in the automatic shift mode. The current gear position is detected from a signal of the gear position switch 23. That the target gear position coincides with the current gear position means that the current gear position is suited for a current vehicle running condition and no shifting up and down is needed. Contrarily, if the target gear position is not equal to the current gear position, it means that the current gear position is not suited for the current vehicle running condition and therefore the gear position change has been started. In the manual mode, it means that a driver intentionally moves the shift lever to another gear position. In the automatic mode, it means that the current point passes a nearest curve. Upon clutch engagement after the shifting operation, there is a possibility that the engine will overrun. The present invention therefore provides an engine overrun prevention control, which will be described below, as the gear position change starts.

At step 102, an engine revolution speed at a target gear position is calculated prior to the gear position change, and compared with a preset value.

Specifically, TMCU 9 first calculates an engine revolution speed expected upon clutch engagement after shifting to the target gear position, from the current output shaft rotation speed and a gear ratio of the target gear position. Then, the resulting value is compared with the preset value. If the former is not less than the latter, TMCU 9 determines that the engine overrun is occurring. If the former is less than the latter, TMCU 9 determines that no overrun has occurred. It should be noted that TMCU 9 memorizes the number of teeth of the respective gears in the transmission 3, and calculates a total gear ratio of the transmission from the gear teeth numbers and the selected gear position.

If it is determined that the overrun occurs, the program proceeds to step 103 to obtain a new target gear position by adding one gear to the current target gear. By doing so, the engine overrun is prevented since the target gear position is raised. If it is determined that there is no overrun, the program goes to END. It should be noted that step 103 may be modified to adding more than one gear to the current target gear.

This control is particularly advantageous when the vehicle speed changes during shifting. For instance, if the clutch is disengaged to shift down the transmission gear while the vehicle is running on a down slope with an engine brake, the vehicle coasts until the clutch is engaged. If the vehicle speed rises prior to clutch engagement, the above described control works. Specifically, in such a case, the overrun prevention control imposes limitation on the gear position change in accordance with the engine revolution speed so that shifting to a target gear position decided by the driver or the map is not permitted; instead, shifting to a one-gear-higher gear position is admitted.

The overrun prevention control is executed in the automatic and manual modes, and in the normal and skip modes. It should be noted, however, that this control is most effective when the driver shifts down the transmission in the manual mode while the vehicle is descending on a downward ramp, slope, hill, etc. For example, if the driver manually shifts down the transmission by two gears, the controller only allows a one-gear shift down if it determines that an engine overrun would occur. Likewise, if the driver moves the shift lever to lower the gear position by one gear, the controller does not permit any gear position change as far as the engine overrun possibly occurs. The overrun prevention control is also effective in the skip mode. For instance, even if the single shifting operation intends to shift down the gear by two gears, the overrun prevention control limits the shifting down by one gear.

As understood from the shift maps shown in FIGS. 5 and 6, the gear ratios of the sixteen-gear transmission are close to each other in the lower gear area. Therefore, a considerably low gear is likely selected upon shifting down. According to the overrun prevention control of the invention, however, a certain limitation is imposed based on the engine revolution speed to prohibit the gear position from being lowered too much (i.e., selecting a gear position higher by one or more gears) when it is determined that the engine revolution speed will become excessively high. Consequently, the engine overrun is avoided.

In this manner, the engine overrun is prevented so that deceleration shock upon clutch engagement after shifting is greatly softened and consequently the driver will not experience uncomfortableness throughout the gear position operation. Conventionally, if a trailer tows a loaded trailer and is decelerated considerably to an extent that the engine overruns, the driver feels like being pushed from the back with a heavy load. According to the present invention, however, the driver will not have such uncomfortable feeling.

It should be noted that TMCU 9 is an engine revolution speed calculation means and also functions as a target gear position change means.

The present invention is not limited to the described embodiment. For example, the vehicle speed may directly be detected by a speed sensor. The specific structure of the transmission 3 is not limited to the illustrated one. The automatic transmission 3 may not have an automatic shift mode, and may only possess a manual shift mode.

What is claimed is:

1. An engine overrun prevention apparatus suitable for a vehicle automatic transmission, said apparatus comprising:
    a first controller for calculating an engine revolution speed to be expected after shifting from a current gear position to a target gear position, based on a current vehicle speed and a gear ratio of an automatic transmission at the target gear position; and
    a second controller for changing the target gear position to a higher gear position when the calculated expected engine revolution speed is not less than a preset value;
    wherein the calculation of the expected engine revolution speed by the first controller and the changing of the target gear position by the second controller are done prior to an actual shifting operation of the automatic transmission toward the target gear position.

2. The engine overrun prevention apparatus according to claim 1, wherein the second controller changes the target gear position by one gear.

3. The engine overrun prevention apparatus according to claim 1, wherein the second controller changes the target gear position by more than one gear.

4. The engine overrun prevention apparatus according to claim 1, wherein the target gear position is determined from manual movement of a shift lever, and the automatic transmission is a remote control type manual transmission that is shifted up and down under the control of another controller based on a signal generated upon the manual movement of the shift lever.

5. The engine overrun prevention apparatus according to claim 2, wherein the target gear position is determined from manual movement of a shift lever, and the automatic transmission is a remote control type manual transmission that is shifted up and down under the control of another controller based on a signal generated upon the manual movement of the shift lever.

6. The engine overrun prevention apparatus according to claim 3, wherein the target gear position is determined from manual movement of a shift lever, and the automatic transmission is a remote control type manual transmission that is shifted up and down under the control of another controller based on a signal generated upon the manual movement of the shift lever.

7. The engine overrun prevention apparatus according to claim 4, wherein the signal is generated by a shift switch associated with the shift lever.

8. The engine overrun prevention apparatus according to claim 5, wherein the signal is generated by a shift switch associated with the shift lever.

9. The engine overrun prevention apparatus according to claim 6, wherein the signal is generated by a shift switch associated with the shift lever.

10. The engine overrun prevention apparatus according to claim 1, wherein the preset value is determined such that an engine will not overrun upon clutch engagement after shifting down.

11. The engine overrun prevention apparatus according to claim 2, wherein the preset value is determined such that an engine will not overrun upon clutch engagement after shifting down.

12. The engine overrun prevention apparatus according to claim 3, wherein the preset value is determined such that an engine will not overrun upon clutch engagement after shifting down.

13. An apparatus comprising:
   calculation means for calculating an engine revolution speed to be expected after shifting a vehicle automatic transmission from a current gear position to a target gear position, based on current vehicle speed and a gear ratio of the automatic transmission at the target gear position; and
   gear position change means for changing the target gear position to a higher gear position when the calculated expected engine revolution speed is not less than a preset value;
   wherein the calculation of the expected engine revolution speed by the calculation means and the changing of the target gear position by the gear position change means are done prior to an actual shifting operation of the automatic transmission toward the target gear position.

14. The apparatus according to claim 13, wherein the gear position change means changes the target gear position by at least one gear.

15. The apparatus according to claim 13, wherein the target gear position is determined from manual movement of a shift lever.

16. The apparatus according to claim 13, wherein the target gear position is determined from a signal is generated by a shift switch associated with a shift lever.

17. The apparatus according to claim 13, wherein the preset value is determined such that an engine will not overrun upon clutch engagement after shifting down.

18. The apparatus according to claim 14, wherein the preset value is determined such that an engine will not overrun upon clutch engagement after shifting down.

19. A method comprising the steps of:
   A) determining whether an expected engine revolution speed at a target gear position of an automatic transmission is greater than a preset value prior to an actual shifting operation of the automatic transmission toward the target gear position; and
   B) thereafter changing the target gear position to a higher gear position prior to the actual shifting operation of the automatic transmission toward the target gear position if the determined expected engine revolution speed is greater than the preset value.

20. The method according to claim 19, wherein the target gear position is raised by at least one gear in the step B.

* * * * *